(12) United States Patent
Mosier (10) Patent No.: US 12,284,372 B2
(45) Date of Patent: Apr. 22, 2025

(54) SYSTEMS AND METHODS FOR ENCODING AN INTERACTIVE SOFTWARE VIDEO STREAM

(71) Applicant: Microsoft Technology Licensing, LLC, Redmond, WA (US)

(72) Inventor: Scott David Mosier, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 19 days.

(21) Appl. No.: 17/962,773

(22) Filed: Oct. 10, 2022

(65) Prior Publication Data

US 2024/0121416 A1 Apr. 11, 2024

(51) Int. Cl.
*H04N 19/42* (2014.01)
*H04N 19/136* (2014.01)
*H04N 19/172* (2014.01)
*H04N 19/40* (2014.01)

(52) U.S. Cl.
CPC ............ *H04N 19/42* (2014.11); *H04N 19/136* (2014.11); *H04N 19/172* (2014.11); *H04N 19/40* (2014.11)

(58) Field of Classification Search
CPC .............................. H04N 19/42; H04N 19/136
See application file for complete search history.

(56) References Cited

U.S. PATENT DOCUMENTS

| 2006/0050780 | A1* | 3/2006 | Cooper | H04N 19/164 |
| | | | | 375/240.01 |
| 2009/0006643 | A1 | 1/2009 | Lee | |
| 2017/0134729 | A1* | 5/2017 | Lo | H04N 19/177 |
| 2021/0093960 | A1* | 4/2021 | Cerny | H04N 19/142 |
| 2022/0400274 | A1* | 12/2022 | Rao | H04L 65/612 |

OTHER PUBLICATIONS

International Search Report and Written Opinion received for PCT Application No. PCT/US23/032231, mailed on Nov. 21, 2023, 13 pages.

* cited by examiner

*Primary Examiner* — Jerry T Jean Baptiste
(74) *Attorney, Agent, or Firm* — RAY QUINNEY & NEBEKER P.C.; John O. Carpenter (57) ABSTRACT

A method of encoding video streams includes, at an encoding device, receiving a first video stream frame from a first server device at the encoding device at a first receipt time; receiving a second video stream frame from a second server device at the encoding device at a second receipt time; encoding the first video stream frame with the encoding device; determining a delay duration based at least partially on a first encoding duration of the first video stream frame and the second receipt time; and transmitting a delay instruction based at least partially on the delay duration to the second server device.

20 Claims, 6 Drawing Sheets

SYSTEMS AND METHODS FOR ENCODING AN INTERACTIVE SOFTWARE VIDEO STREAM

BACKGROUND

Background and Relevant Art

In streamed video content, encoding of the video frames can introduce delays in the transmission of the video frames from a server device to a client device. Conventional streamed video is agnostic to the delay, as the video content is non-interactive. However, during streaming of interactive software application, encoding delays increase lag between user inputs from a client device and video frames delivered to the client device.

BRIEF SUMMARY

In some embodiments, a method of encoding video streams includes, at an encoding device, receiving a first video stream frame from a first server device at the encoding device at a first receipt time; receiving a second video stream frame from a second server device at the encoding device at a second receipt time; encoding the first video stream frame with the encoding device; determining a delay duration based at least partially on a first encoding duration of the first video stream frame and the second receipt time; and transmitting a delay instruction based at least partially on the delay duration to the second server device.

In some embodiments, a system for encoding video streams comprises an encoding device that includes a processor, a communication device in data communication with the processor and configured to receive video stream frames, and a hardware storage device in data communication with the processor. The hardware storage device having instructions stored thereon that, when executed by the processor, cause the encoding device to receive a first video stream frame from a first server device at the encoding device at a first receipt time, receive a second video stream frame from a second server device at the encoding device at a second receipt time, encode the first video stream frame, determine a delay duration based at least partially on an encoding time of the first video stream frame and the second receipt time, and transmitting a delay instruction based at least partially on the delay duration to the second server device.

In some embodiments, a method of encoding a video stream includes, at an encoding device, receiving a first video stream frame from a first server device at the encoding device at a first receipt time, receiving a second video stream frame from a second server device at the encoding device at a second receipt time; encoding the first video stream frame with the encoding device; encoding the second video stream frame with the encoding device; determining a delay duration based at least partially on a first encoding duration of the first video stream frame, a second encoding duration of the second video stream frame, and a frame duration; determining an idle processor duration; and transmitting a delay instruction to the second server device based at least partially on the delay duration and the idle processor duration.

This Summary is provided to introduce a selection of concepts in a simplified form that are further described below in the Detailed Description. This Summary is not intended to identify key features or essential features of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2-1 is a timeline of an encoding device encoding video frames, according to at least some embodiments of the present disclosure;

FIG. 2-2 is a schematic representation of a frame duration of the timeline of FIG. 2-1, according to at least some embodiments of the present disclosure;

FIG. 2-3 is a schematic representation of another frame duration after transmitting delay instructions, according to at least some embodiments of the present disclosure;

FIG. 2-4 is a schematic representation of a timeline illustrating delayed video frame receipts to reduce lag, according to at least some embodiments of the present disclosure;

DETAILED DESCRIPTION

The present disclosure generally relates to systems and methods for encoding an interactive software video stream. More particularly, systems and methods described herein relate to reducing a delay between a server device transmitting a video frame to an encoding device and the encoding device encoding the video frame.

Encoding a video stream requires encoding each frame of the video stream. A video stream is provided from a server device to a client device for viewing of the video stream. In some embodiments, the encoding is performed at an intermediate encoding device, such as a transcoding server. When only a single video stream is encoded at the encoding device, the encoding device receives a video frame at a receipt time, begins encoding the video frame at the receipt time, and transmits the encoded video frame upon completion at a transmission time. The encoding duration may vary depending on the content of the video frame (e.g., detail, contrast, dynamic range).

In some embodiments, the encoding includes slice encoding. Slice encoding allows a portion of the video frame less than the entire frame to be encoded and/or transmitted at a time. For example, a video frame may be encoded in ¼ portions wherein each ¼ of the video frame is encoded and transmitted in sequence. As used herein, the encoding duration should be understood to be the total encoding time needed to encode the video frame when the video frame is encoded in its entirety or via slice encoding. The transmission time should be understood to be the transmission time of the entire video frame and/or the final portion of the video frame needed to complete the encoding and transmission of the video frame.

In some cases, the encoding duration is less than a frame duration. For example, the video stream may include 24 frames per second (fps), 30 fps, 45 fps, 60 fps, 120 fps, 240 fps, or other values therebetween. In the example of a 60 fps video stream, the frame duration is approximately 16.67 milliseconds (ms). In some embodiments, an encoding duration is approximately 4 ms, meaning the encoding device may remain idle for approximately 75% of the processor time while encoding only a single 60 fps video stream.

Efficient utilization of an encoding device may include receiving and encoding multiple video streams concurrently. In some embodiments, the frame of each video stream is encoded in the order that the frames are received at the encoding device. For example, a frame of a first stream may arrive at a first receipt time and a frame of a second stream may arrive a second receipt time. In some cases, the encoding device receives the frame from the second stream while encoding the frame of the first stream. In such cases, the frame from the second stream is held in memory (e.g., a buffer, cache) while the encoding device completes encoding the frame from the first stream. The encoding device then transmits the encoded frame of the first stream and begins encoding the frame of the second stream.

In the above example of 60 fps streams with a 16.67 ms frame duration, a 4 ms encoding duration of each frame allows time for the encoding device to receive up to 4 videos streams concurrently, encode each, and transmit the encoded video frames within a single frame duration. For example, the encoding device may receive frames from 4 video streams within the encoding duration of the frame of the first video stream, and the encoding device will encode the frames from each of the 4 video streams sequentially within the frame duration. In some embodiments, the frames of each of the 4 video streams are queued and encoded in the order received by the encoding device (first in, first out). In some embodiments, one or more of the video streams may be prioritized over other video streams to encode and transmit the frame of that video stream before encoding the frame of other video streams. For example, the encoding device may receive a frame from each of a first video stream, a second video stream, a third video stream, and a fourth video stream within a small window of time. The encoding device may begin encoding the frame of the first video stream, and the frames of the second video stream, the third video stream, and the fourth video stream may arrive within the encoding duration of the frame of the first video stream. In such cases, the encoding device may prioritize, for example, the frame of the fourth video stream and alter the queue of frames to be encoded after completing the current encoding task (e.g., the frame of the first stream).

In conventional video streaming services, the time elapsed between the receipt time of a frame and the transmission time of the frame has little to no effect on the user's experience of the video stream. For example, for a non-interactive video stream, a frame of a fourth video stream may be received at substantially the start of a frame duration. Due to frames from three other video streams arriving before the frame of the fourth video stream, the total time elapsed between the receipt time of the frame of the fourth video stream arriving at the encoding device and the transmission time of the encoded frame of the fourth video stream sent to a client device for viewing may be the encoding duration of the frame of the first video stream, the encoding duration of the frame of the second video stream, the encoding duration of the frame of the third video stream, and the encoding duration of the frame of the fourth video stream. In such an example, the total time elapsed may be approximately 4 times as long as simply encoding the frame of the fourth video stream. However, this effect is transparent to the user, as the fourth video stream is non-interactive, and any delay in the encoding of the video stream is not noticeable to the user, as long as the frame rate of the video stream remains consistent.

When considering interactive video streams, such as when streaming a video game, other remotely executed software application, or cloud-based software service, the total time elapsed between the receipt time and transmission time of a frame of a video stream at the encoding device introduces or contributes to lag between a user's input from the client device to the server device. In the example of the fourth video stream above, the additional lag would correspond to nearly an entire frame of the video game, degrading the user's experience and responsiveness of the video game or other interactive software.

In some embodiments, according to the present disclosure, the encoding device can temporally multiplex the encoding processes of the video streams by transmitting delay instructions to the server device(s) to delay rendering and/or transmission of the frame(s) of the video stream. For example, the encoding device may calculate a delay timing and instruct a server device to delay the rendering of a frame of the video stream by, for example, 8 ms, to ensure the frame arrives just-in-time for the encoding device to complete a prior encoding task and be available to encode the frame immediately. By coordinating the server devices, the "just-in-time" encoding can limit and/or eliminate delays beyond the encoding duration for each video stream.

Figure 1:
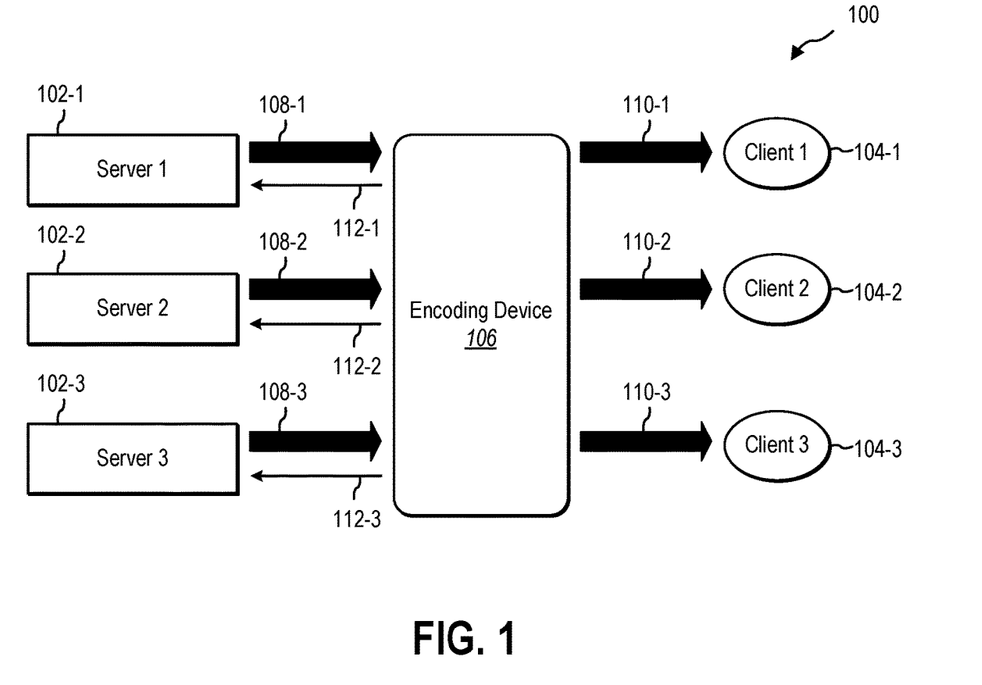
FIG. 1 is a schematic representation of an encoding system, according to at least some embodiments of the present disclosure.

FIG. 1 is a schematic representation of an interactive software streaming system 100 including a plurality of server devices 102-1, 102-2, 102-3 that each execute a software application and render video frames for a corresponding client device 104-1, 104-2, 104-3 of a plurality of client devices. The system includes an encoding device 106 positioned therebetween in the data communication channels and/or the network. For example, the first server device 102-1 transmits a first frame 108-1 to the encoding device 106, the encoding device 106 encodes the first frame 108-1, and an encoded first frame 110-1 is transmitted to the first client device 104-1. In some embodiments, the second server device 102-2 also sends a second frame 108-2 to the encoding device 106, and the second frame 108-2 is received at the encoding device 106 while the encoding device 106 is encoding the first frame 108-1. In such an example, the encoding device 106 delays encoding the second frame 108-2 until the encoded first frame 110-1 is completed.

While this delay is not noticeable to a user with a non-interactive video stream, with an interactive video stream, such as a streamed video game, the delay can impact the quality of the user' experience. For example, a user will input a user input at the third client device 104-3 in response to seeing the encoded third frame 110-3. The user input is transmitted to the respective third server device 102-3 with the associated delay due to the encoding delay. In some embodiments, a server device is a video game server, and the video game server provides the video stream of an interactive application executed thereon. In such an example, a user's experience can be negatively affected by a lag between the user input and the received video frame of as little as a single frame.

In some embodiments, the encoding device 106 can transmit a delay instruction 112-1, 112-2, 112-3 to each server device 102-1, 102-2, 102-3. The delay instruction 112-1, 112-2, 112-3 coordinates the rendering of the video frames of the server device 102-1, 102-2, 102-3 and the transmission of the video frames to the encoding device 106. By coordinating the rendering and/or transmission of the video frames, the delay instruction 112-1, 112-2, 112-3 can allow the encoding device 106 to limit any delay associated with the encoding tasks. In particular, by instructing the server device 102-1, 102-2, 102-3 to delay the rendering of the frames of the interactive software, the total delay between the actions or effects taking place in the interactive software and the user viewing the video frames associated with the actions or effects is reduced. In at least one example, a second server device 102-2 receives a user input from the second client device 104-2 and renders a video frame that reflects the user input (such an item select in an interface or activating an ability of an avatar in a game environment). A delay in the video frame arriving at the second client device 104-2 for viewing by the user can cause the video and user inputs to feel disconnected or "laggy" to the user. A second delay instruction 112-2 to the second client device 102-2 can, for a single frame, delay the rendering of the video frames of the interactive software to reduce the perceived input lag for all subsequent video frames and improve the perceived responsiveness of the interactive software rendered at the second server device 102-2 to the user at the second client device 104-2.

Figure 21:
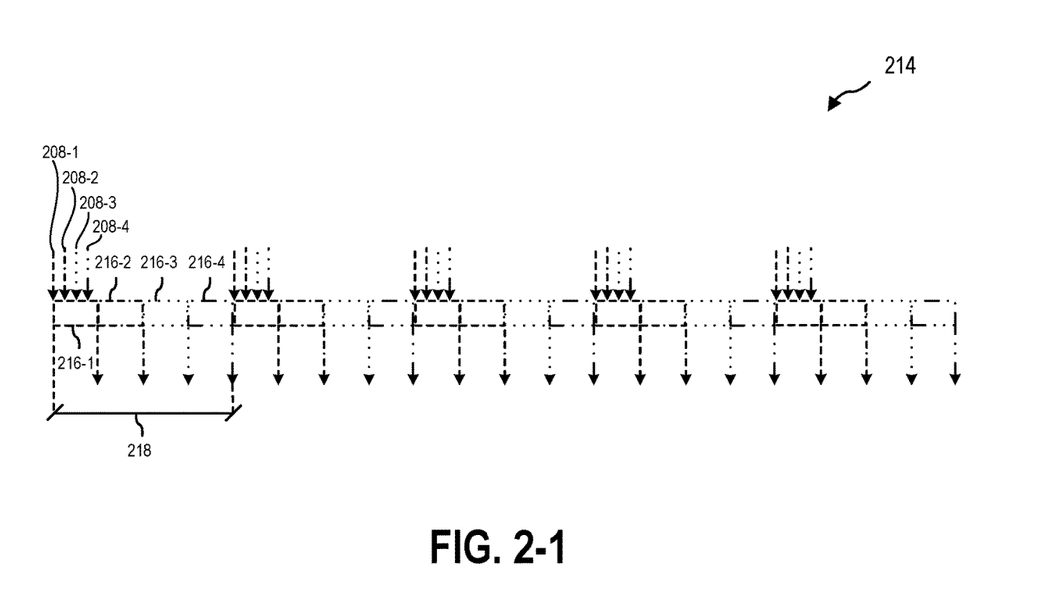

FIG. 2-1 is a timeline 214 illustrating an example of lag associated with conventional video frame encoding. In some embodiments, a first video stream frame 208-1 is received by an encoding device at T=0. Each of the second video stream frame 208-2, the third video stream frame 208-3, and the fourth video stream frame 208-4 are received at the encoding device at 1-2 ms intervals (e.g., T=2 ms, T=3 ms, T=5 ms). The first encoding duration 216-1 is approximately 4 ms, and each of the second video stream frame 208-2 and the third video stream frame 208-3 are received during the first encoding duration 216-1, and the fourth video stream frame 208-4 is received during the second encoding duration 216-2. The first video stream frame 208-1 is encoded substantially immediately upon received the first video stream frame 208-1, but the arrival of each of the second video stream frame 208-2, the third video stream frame 208-3, and the fourth video stream frame 208-4 during the first encoding duration 216-1 (e.g., while the encoding device is busy with another encoding task) causes subsequent delays. For example, the second encoding duration 216-2 begins only after the first encoding duration 216-1 ends, and the third encoding duration 216-3 begins only after the second encoding duration 216-2 ends, and so forth. In many examples, the frame rendering rate of the server devices is substantially constant, and the timing of video stream frames repeats during each frame duration 218.

It should be understood that, while the encoding duration 216-1, 216-2 is described herein as the duration of time needed to encode the video stream frame, the encoding duration, in some embodiments, includes processor time to perform additional processing on the video frame prior to encoding the video frame. For example, in order to encode the first video stream frame 208-1 with a particular codec, the encoding device may first decode the video stream frame and then re-encode the first video stream frame 208-1. In other examples, the encoding device may apply one or more video effects or post-processing operations on the video stream frame prior to encoding the video stream frame, and the encoding duration is the amount of time needed to apply the video effect and encode the video stream frame. In any example, it should be understood that the encoding duration is the duration of time the encoding device performs operations on the video stream frame between a receipt time until the encoding is complete at an encoding completion time.

Figure 22:
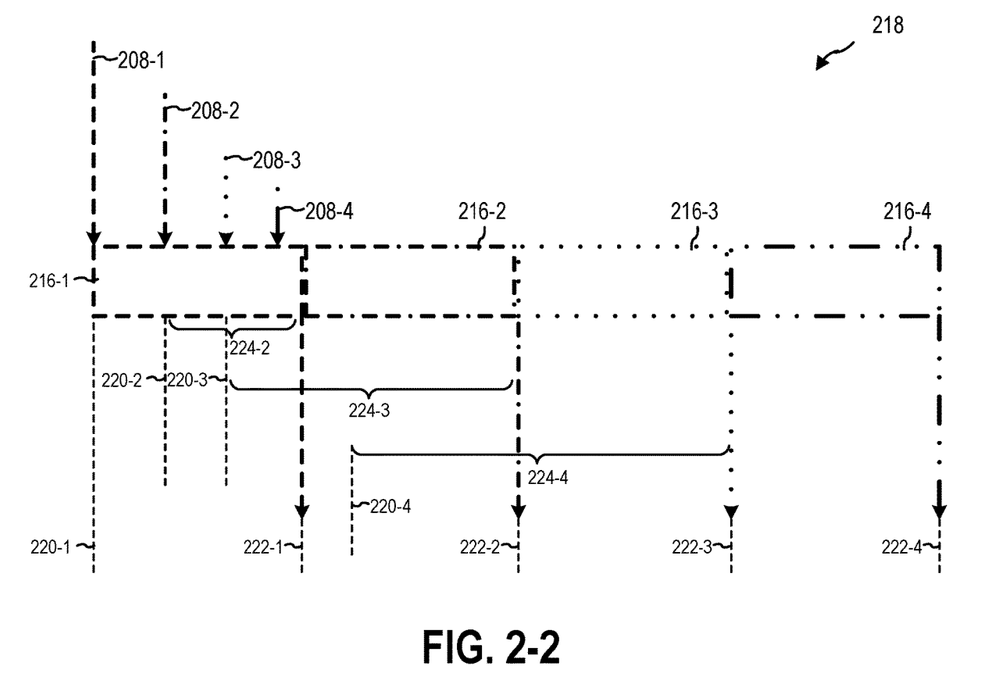

FIG. 2-2 is a detail view of a frame duration 218 of the timeline 214 of FIG. 2-1. While the first video stream frame 208-1 experiences only the first encoding duration 216-1 between the first receipt time 220-1 and the first transmission time 222-1 (after encoding), each of the second video stream frame 208-2, the third video stream frame 208-3, and the fourth video stream frame 208-4 experience an additional delay beyond the respective encoding duration 216-2, 216-3, 216-4 between the respective receipt time 220-2, 220-3, 220-4 and encoding completion time and/or transmission time 222-2, 222-3, 222-4. In some examples, the encoded video frame is transmitted upon completion, and the transmission time is substantially the same as the completion time. In some examples, the transmission time is after the completion time. In at least some embodiments, calculating the delay duration based on the transmission time reduces any encoding delays perceived by the user viewing the encoded video stream at the client device.

A second delay duration 224-2 of the second video stream frame 208-2 is measured, calculated, recorded, or otherwise determined by the encoding device. The encoding device can then transmit the delay instruction back to the second server device based at least partially on the second delay duration 224-2. Likewise, the third delay duration 224-3 and fourth delay duration 224-4 are determined for the third video stream frame 208-3 and the fourth video stream frame 208-4, and delay instructions are transmitted back to the third server device and fourth server device, respectively.

Figure 23:
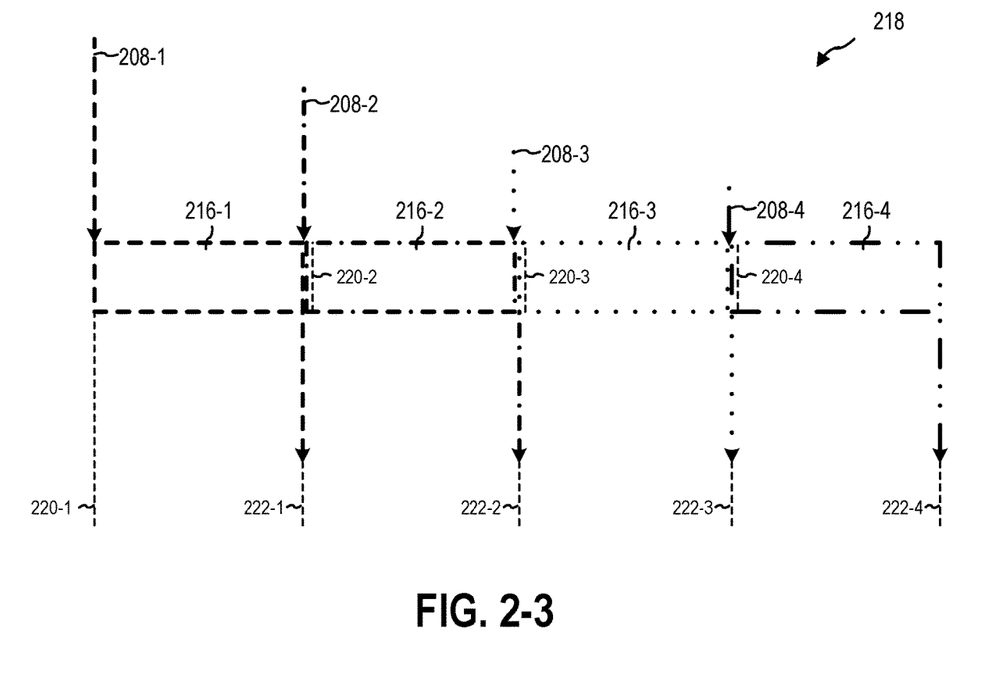

FIG. 2-3 is a detail view of another frame duration 218 (e.g., a subsequent frame duration after FIG. 2-2) after the server devices have received the delay instructions from the encoding device, as described in relation to FIG. 1. In some embodiments, the first video stream frame 208-1 is received at the encoding device at the first receipt time 220-1, encoded for the first encoding duration 216-1, and the encoded frame is transmitted at the first transmission time 222-1. The second video stream frame 208-2 is received at the encoding device at the second receipt time 220-2, which may be substantially the same time as the first transmission time 222-1, encoded for the second encoding duration 216-2, and the encoded frame is transmitted at the second transmission time 222-2. The third video stream frame 208-3 is received at the encoding device at the third receipt time 220-3, which may be substantially the same time as the second transmission time 222-2, encoded for the third encoding duration 216-3, and the encoded frame is transmitted at the third transmission time 222-3. The fourth video stream frame 208-4 is received at the encoding device at the fourth receipt time 220-4, which may be substantially the same time as the third transmission time 222-3, encoded for the fourth encoding duration 216-4, and the encoded frame is transmitted at the fourth transmission time 222-4.

Figure 24:
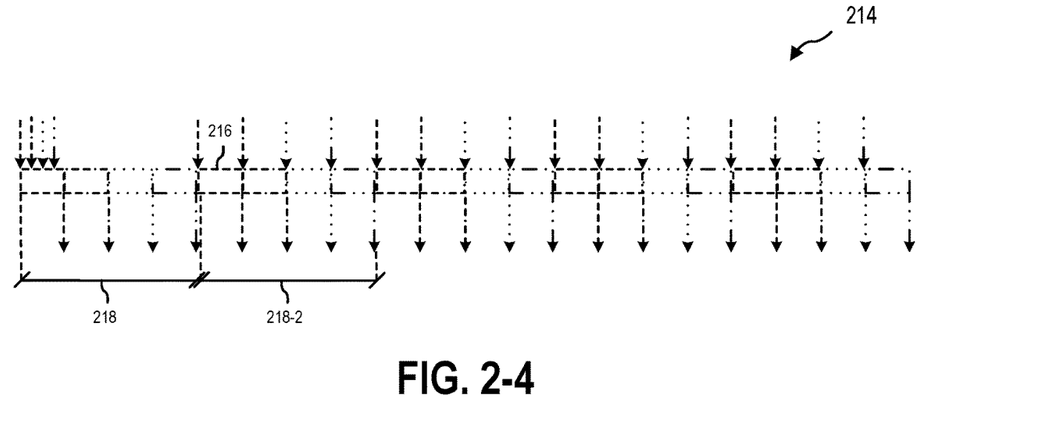

When the delay instructions instruct the server device(s) to delay the rendering and/or transmission by the determined delay duration, there is substantially no gap between each transmission time and successive receipt time (e.g., first transmission time 222-1 and second receipt time 220-2) and the encoding tasks (i.e., the encoding durations) will be tightly packed in sequence. In some embodiments, this will allow efficient use of the encoding device processing capabilities, and the tightly packed encoding tasks will leave any available idle processor time for the encoding device available at the end of the sequence of encoding tasks to allow additional video streams to be added to the encoding device multiplexing. For example, in FIG. 2-4, the timeline 214 of FIG. 2-1 illustrated with the first frame duration 218-1 (as described in relation to FIG. 2-2) and the described delay instructions of FIG. 2-2 to create an efficient, tightly-packed sequence of 4 ms encoding durations 216 in each subsequent frame duration 218-2. In the illustrated embodiment, each encoding duration 216 of the frame duration 218 is approximately 4 ms within a 16.67 ms frame duration 218. This leaves little idle time for the encoding device processor. However, if each encoding duration 216 is 4 ms for a 30 fps frame duration, the four video stream frames have a total encoding duration of 16 ms in a 33.33 ms frame duration, allowing approximately 17.33 ms of idle processor time in the encoding device. In some embodiments, a contiguous 17.33 ms of idle processor time is preferable to smaller non-contiguous blocks of idle processor time.

In some embodiments, tightly packing the encoding tasks in a sequence with little to no gaps between encoding task can be beneficial to allocating additional video streams to the encoding device, allocating other processing tasks to the encoding device (such as in the example of a multi-functional computing device), or allowing additional processing buffer time for variations in encoding duration of each frame received at the encoding device.

Figure 3:
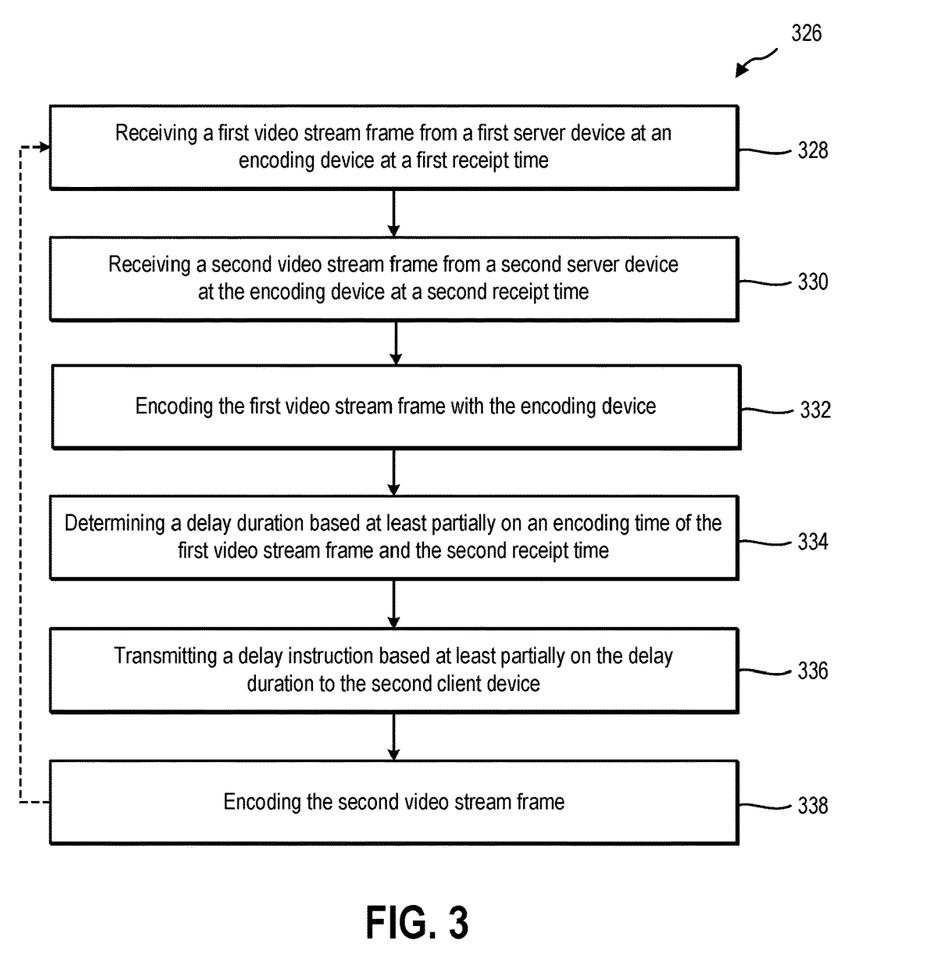
FIG. 3 is a flowchart illustrating a method of encoding a plurality of video streams, according to at least some embodiments of the present disclosure.

FIG. 3 is a flowchart illustrating an embodiment of a method 326 of encoding interactive software video streams. The method 326 includes receiving a first video stream frame from a first server device at an encoding device at a first receipt time at 328 and receiving a second video stream frame from a second server device at the encoding device at a second receipt time at 330. In some embodiments, at least one of the first video stream from the first server device and the second video stream from the second server device is a video stream of an interactive software application. In some embodiments, the first server device is a video game server. In some embodiments, the second server device is a video game server. In some embodiments, both the first server device and the second server device are video game servers.

The method 326 further includes encoding the first video stream frame with the encoding device at 332. In some embodiments, encoding a video stream frame includes AVC, HEVC, VP8, VP9, AV1, AV2, and other codec encoding processes. In some embodiments, encoding a video stream includes transcoding the video stream. For example, the method 326 may include decoding the video stream when the video stream has been previously encoded (such as a previously compressed video) and re-encoding the video stream after decoding.

In some embodiments, the video stream is transcoded to change the encoding of the video stream. In some embodiments, additional video processing may be performed on the video stream prior to encoding. For example, video effects, such as post-processing, quality analysis, and/or shaders may be applied to the video frame(s) of the video stream prior to encoding, and in some examples, the video stream is decoded to allow the application of such video effects prior to re-encoding. In other examples, a first video stream and a second video stream may be merged and/or composited before encoding the outgoing video stream. In some instances, the first video stream and/or second video stream are decoded prior to merging and subsequent encoding of the merged outgoing video stream.

In some embodiments, the method 326 further includes determining a delay duration based at least partially on an encoding time of the first video stream frame and the second receipt time at 334. For example, a delay duration may be based at least partially on a time difference the second receipt time and an end of the first encoding duration of the first video stream frame. In another example, the delay duration may be based at least partially on a time difference the second receipt time, an end of the first encoding duration of the first video stream frame, and a time buffer to allow variations in the first encoding duration. In at least one example, the delay duration of the second video stream frame is a time difference between a second receipt time and a first transmission time of the first video stream frame at the end of the first encoding duration. In some embodiments, the delay duration is based at least partially on the first encoding duration relative to a frame duration (e.g., the available time to encode the second video stream frame) as will be described herein.

The method 326 includes transmitting a delay instruction to the second client device based at least partially on the delay duration at 336 and encoding the second video stream frame at 338. In some embodiments, the method 326 repeats with a second set of frames arriving from the first video stream and the second video stream.

Figure 4:
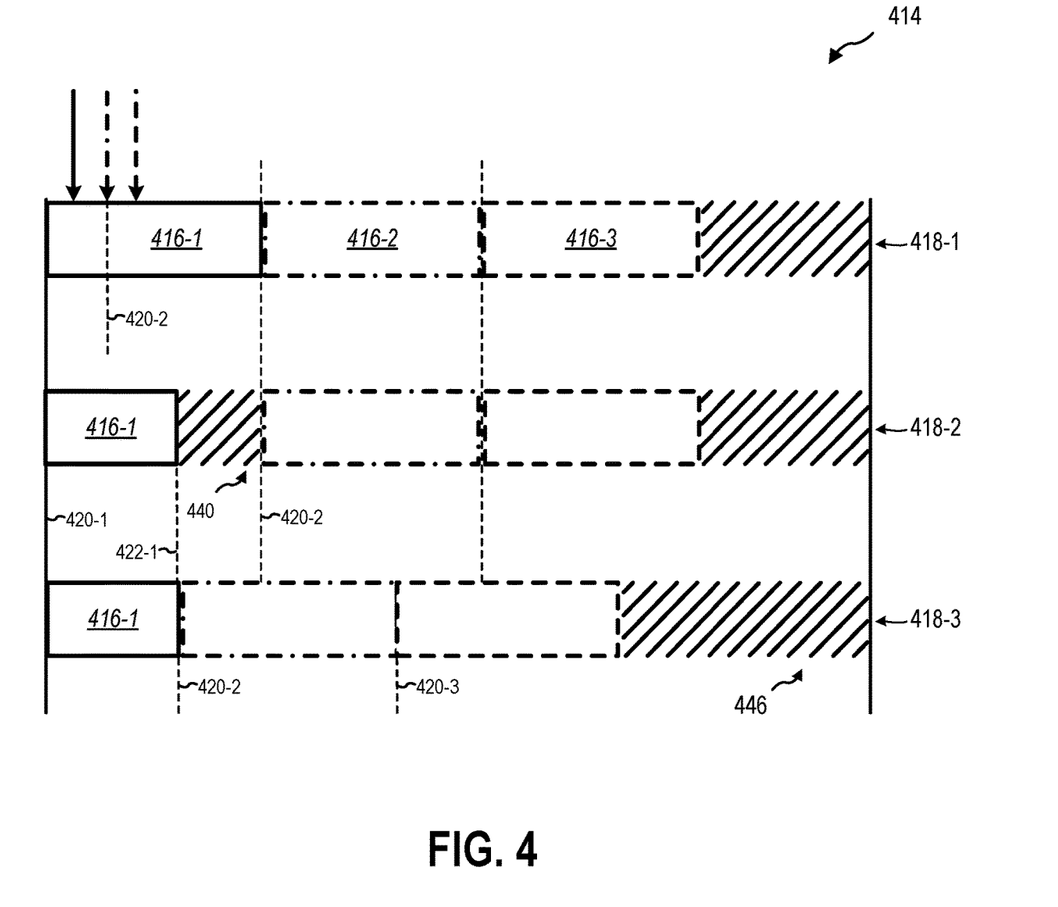
FIG. 4 is a comparison of subsequent frame durations of an encoding device changing receipt times of video streams to increase contiguous processor idle duration, according to at least some embodiments of the present disclosure.

FIG. 4 illustrates another embodiment of an encoding timeline 414 according to the present disclosure. As described herein, it may be desirable to tightly pack the encoding tasks to provide a contiguous idle processor time in the frame duration. It should be understood that while some embodiments of a delay duration have a positive delay duration, in other embodiments, the delay duration may have a negative value or be a negative delay duration. For example, FIG. 4 illustrates an embodiment of timeline 414 with a first frame duration 418-1 wherein a second receipt time 420-2 of a second video stream frame is within a first encoding duration 416-1 of the first video stream frame. The first frame duration 418-1 includes a second encoding duration 416-2 and a third encoding duration 416-3. In some embodiments, a second frame duration 418-2 after the first frame duration 418-1 reflects a reduced first encoding duration 416-1, such as the encoding device requiring less processing time to encode the subsequent first video stream frame in the first video stream.

The reduced first encoding duration 416-1 of the second frame duration 418-2, however, introduces a gap 440 between the first transmission time 422-1 and the second receipt time 420-2. In such an embodiment, the second delay duration 424-2 may be determined to be negative as the second receipt time 420-2 is after the first transmission time 422-1 and/or the difference between the first receipt time 420-1 and the second receipt time 420-2 is greater than the first encoding duration 416-1 in the second frame duration 418-2.

A delay instruction may be transmitted from the encoding device to the second server device (and, optionally, any server devices associated with subsequent video streams such as the third server device) to instruct the second server device to provide future frames earlier by an amount related to the delay duration. The third frame duration 418-3 illustrates the second receipt time 420-2 and third receipt time 420-3 moving earlier within the third frame duration 418-3 to compensate for the change in the first encoding duration 416-1 and remove and/or reduce the gap 440, thereby increasing the contiguous processor idle duration 446 proximate the end of the third frame duration 418-3.

Figure 5:
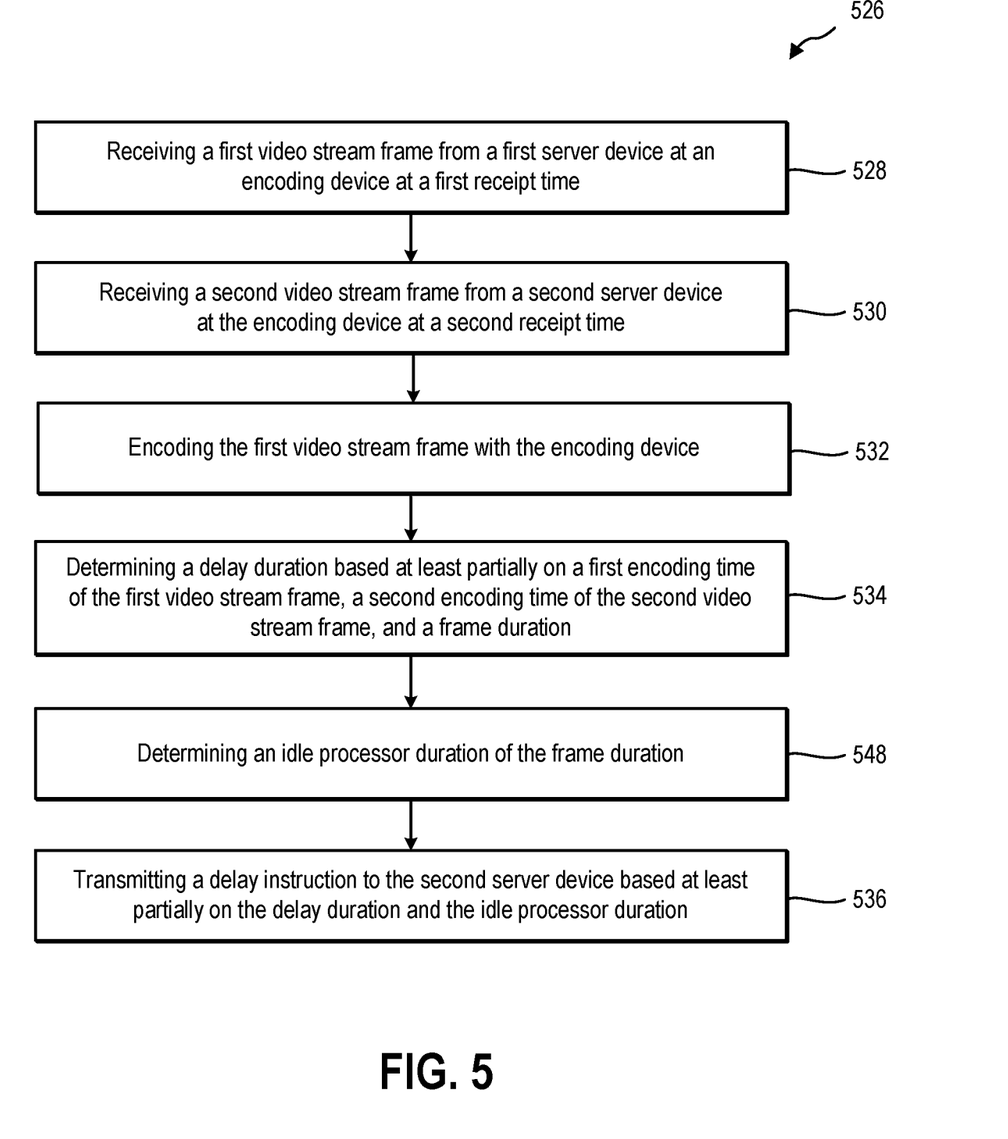
FIG. 5 is a flowchart illustrating another method of encoding a plurality of video streams, according to at least some embodiments of the present disclosure.

While FIG. 4 illustrates a negative delay duration value for tightly packing the encoding tasks, in other embodiments, the encoding device may temporally space the encoding tasks with a minimum gap therebetween to provide a buffer. In some embodiments, the encoding tasks are temporally spaced such that the gaps between each encoding task are substantially equal. FIG. 5 is a flowchart illustrating another method 526 of encoding interactive software video streams. The method 526 includes receiving a first video stream frame from a first server device at an encoding device at a first receipt time at 528 and receiving a second video stream frame from a second server device at the encoding device at a second receipt time at 530. In some embodiments, at least one of the first video stream from the first server device and the second video stream from the second server device is a video stream of an interactive software application. In some embodiments, the first server device is a video game server. In some embodiments, the second server device is a video game server. In some embodiments, both the first server device and the second server device are video game servers.

The method 526 further includes encoding the first video stream frame with the encoding device at 532. In some embodiments, encoding a video stream frame includes AVC, HEVC, VP8, VP9, AV1, AV2, and other codec encoding processes. In some embodiments, encoding a video stream includes transcoding the video stream. For example, the method 526 may include decoding the video stream when the video stream has been previously encoded (such as a previously compressed video) and re-encoding the video stream after decoding.

In some embodiments, the video stream is transcoded to change the encoding of the video stream. In some embodiments, additional video processing may be performed on the video stream prior to encoding. For example, video effects, such as post-processing, quality analysis, and/or shaders may be applied to the video frame(s) of the video stream prior to encoding, and in some examples, the video stream is decoded to allow the application of such video effects prior to re-encoding. In other examples, a first video stream and a second video stream may be merged and/or composited before encoding the outgoing video stream. In some instances, the first video stream and/or second video stream are decoded prior to merging and subsequent encoding of the merged outgoing video stream.

In some embodiments, the method 526 further includes determining a delay duration based at least partially on a first encoding time of the first video stream frame, a second encoding duration of the second video stream frame, and the frame duration at 534. In some embodiments, the encoding device determines the first encoding duration, the second encoding duration, and the frame duration. The method 526 further includes determining an idle processor duration of a frame duration at 548 and transmitting a delay instruction to at least the second server device wherein a delay duration is based at least partially on the idle processor duration. For example, the delay instruction may space the encoding task with equal gaps between the encoding tasks within the frame duration.

Figure 6:
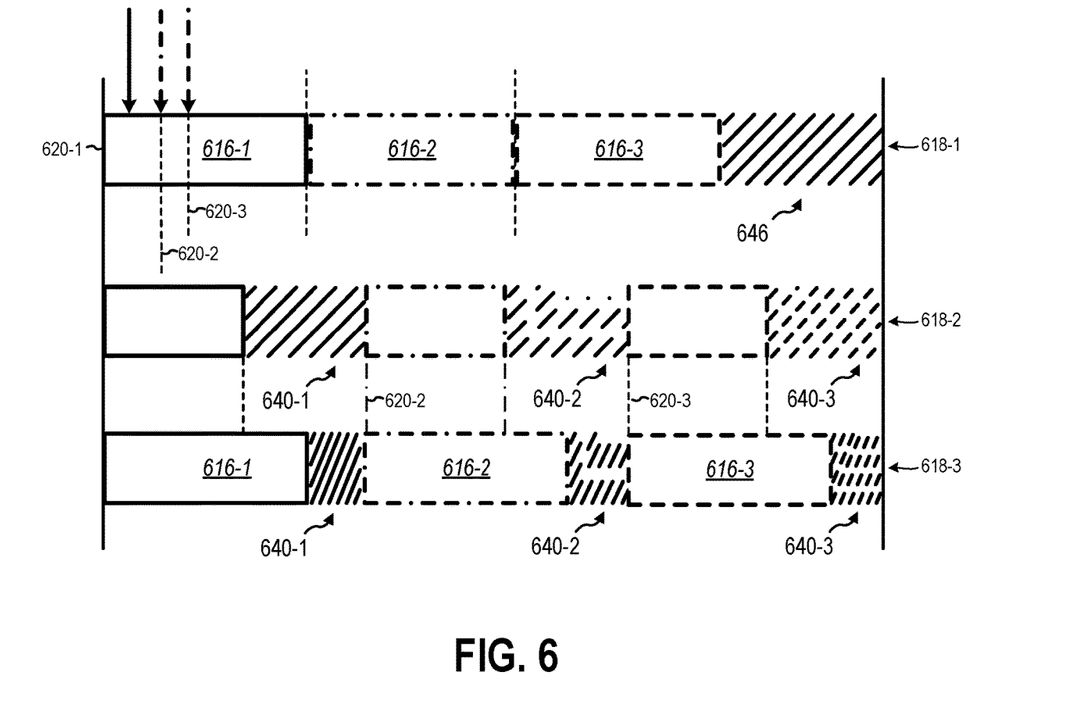
FIG. 6 is a comparison of subsequent frame durations of an encoding device changing receipt times of video streams to creates gaps between encoding tasks, according to at least some embodiments of the present disclosure.

FIG. 6 illustrates an embodiment of three frame durations 618-1, 618-2, 618-3. In the first frame duration 618-1, the encoding device receives a first video stream frame at a first receipt time 620-1, a second video stream frame at a second receipt time 620-2, and a third video stream frame at a third receipt time 620-3. In the illustrated embodiment, all three video stream frames arrive within the first encoding duration 616-1. When the first encoding duration 616-1 completes, the second encoding duration 616-2 begins. When the second encoding duration 616-2 completes, the third encoding duration 616-3 begins. When the third encoding duration 616-3 completes, the encoding device processor is idle for the remainder of the first frame duration 618-1.

In some embodiments, the idle duration 646 after encoding the first video stream frame, the second video stream frame, and the third video stream frame is divided into equal parts. A delay instruction is transmitted to each of the second server device and the third server device to delay the second receipt time 620-2 and the third receipt time 620-3 such that a first gap 640-1 after the first encoding duration 616-1 is substantially equal to the second gap 640-2 after the second encoding duration 616-2, which is substantially equal to the third gap 640-3 after the first encoding duration 616-3 as shown in the second frame duration 618-2 of FIG. 6. As illustrated in the third frame duration 618-3 of FIG. 6, the gaps 640-1, 640-2, 640-3 each allow for variations in the encoding durations 616-1, 616-2, 616-3 without introducing lag and/or prompting additional delay instructions transmitted to the server devices.

In some embodiments, the encoding device transmits new delay instructions to change the receipt time of video stream frames when an encoding duration varies from an expected value (e.g., previous value, average value, rolling average, etc.) by an amount greater than a threshold value. For example, the threshold value may be a nominal value, such as 1 ms, 2 ms, 4 ms, or more. In other examples, the threshold value may be a percentage value, such as a 5% variation, a 10% variation, 20% variation, etc. In some embodiments, the encoding device transmits new delay instructions to change the receipt time of video stream frames when a video stream terminates, allowing processor availability of the encoding device.

In some embodiments, the encoding device transmits new delay instructions to change the receipt time of video stream frames upon a set or adaptive time interval. For example, the time interval may be a nominal value, such as 100 ms, 200 ms, 400 ms, 1000 ms, or more. In other examples, the time interval may be a quantity of frame durations, such as 4 frame durations, 8 frame durations, 24 frame durations, 60 frame durations, 600 frame durations, or any values therebetween. In some embodiments, the encoding device transmits new delay instructions to change the receipt time of video stream frames when a video stream is assigned to or accepted by the encoding device or terminates, changing processor availability of the encoding device. For examples, the time interval may be adaptive and change with the quantity of video streams concurrently processed and/or encoded by the encoding device. In some examples, the time interval may shorten when additional video streams are concurrently processed and/or encoded by the encoding device to ensure the plurality of video streams is efficiently managed. In some examples, the time interval may lengthen when additional video streams are concurrently processed and/or encoded by the encoding device to limit the number of times delay instructions are sent to multiple server devices.

Figure 7:
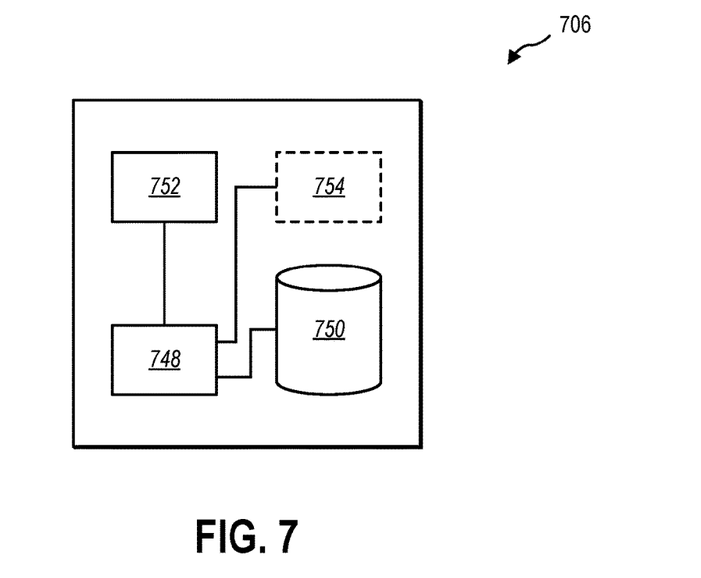
FIG. 7 is a schematic representation of an encoding device, according to at least some embodiments of the present disclosure.

An encoding device, according to some embodiments of the present disclosure, is configured to perform some or all of any of the methods described herein. Referring now to FIG. 7, an encoding device 706 in some embodiments, includes a processor 748 that is configured to perform all of, or at least part of, the methods described herein. For example, a computing device encoding device includes a processor 748 in communication with a hardware storage device 750. The hardware storage device 750 can be any non-transient computer readable medium that may store instructions thereon. The hardware storage device 750 may be any type of solid-state memory; volatile memory, such as static random access memory (SRAM) or dynamic random access memory (DRAM); non-volatile memory, such as read-only memory (ROM) including programmable ROM (PROM), erasable PROM (EPROM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media. The hardware storage device 750 includes instruction stored thereon that, when executed by the processor 748, cause the encoding device 706 to perform any method or part of a method described herein.

The encoding device 706 further includes a communication device 752, such as a wireless or wired communication device, that allows transmission and receipt of data between the encoding device 706 and external computing devices, such as server devices and the client devices. In some embodiments, the encoding device 706 receives video stream frames at the communication device 752 from the server device(s) and transmits encoding video stream frames from the communication device 752 to the client device(s).

In some embodiments, the encoding device optionally includes a specialized processor 754 in data communication with the processor 748, such as a graphical processing unit (GPU) or an application-specific integrated circuit (ASIC) for encoding or performing additional video processing on the video stream frame(s).

In at least some embodiments of the present disclosure, an encoding device according to the present disclosure coordinates video frame rendering and transmission from a plurality of server devices to reduce input lag for interactive software applications. By reducing encoding delays and shortening the time between a frame being rendered at the server device and the frame being viewed by a user at a client device, the encoding device can improve the user's experience interactive with the software.

INDUSTRIAL APPLICABILITY

Encoding a video stream requires encoding each frame of the video stream. A video stream is provided from a server device to a client device for viewing of the video stream. In some embodiments, the encoding is performed at an intermediate encoding device, such as a transcoding server.

When only a single video stream is encoded at the encoding device, the encoding device receives a video frame at a receipt time, begins encoding the video frame at the receipt time, and transmits the encoded video frame upon completion at a transmission time. The encoding duration may vary depending on the content of the video frame (e.g., detail, contrast, dynamic range).

In some embodiments, the encoding includes slice encoding. Slice encoding allows a portion of the video frame less than the entire frame to be encoded and/or transmitted at a time. For example, a video frame may be encoded in ¼ portions wherein each ¼ of the video frame is encoded and transmitted in sequence. As used herein, the encoding duration should be understood to be the total encoding time needed to encode the video frame when the video frame is encoded in its entirety or via slice encoding. The transmission time should be understood to be the transmission time of the entire video frame and/or the final portion of the video frame needed to complete the encoding and transmission of the video frame.

In some cases, the encoding duration is less than a frame duration. For example, the video stream may include 24 frames per second (fps), 30 fps, 45 fps, 60 fps, 120 fps, 240 fps, or other values therebetween. In the example of a 60 fps video stream, the frame duration is approximately 16.67 milliseconds (ms). In some embodiments, an encoding duration is approximately 4 ms, meaning the encoding device may remain idle for approximately 75% of the processor time while encoding only a single 60 fps video stream.

Efficient utilization of an encoding device may include receiving and encoding multiple video streams concurrently. In some embodiments, the frame of each video stream is encoded in the order that the frames are received at the encoding device. For example, a frame of a first stream may arrive at a first receipt time and a frame of a second stream may arrive a second receipt time. In some cases, the encoding device receives the frame from the second stream while encoding the frame of the first stream. In such cases, the frame from the second stream is held in memory (e.g., a buffer, cache) while the encoding device completes encoding the frame from the first stream. The encoding device then transmits the encoded frame of the first stream and begins encoding the frame of the second stream.

In the above example of 60 fps streams with a 16.67 ms frame duration, a 4 ms encoding duration of each frame allows time for the encoding device to receive up to 4 videos streams concurrently, encode each, and transmit the encoded video frames within a single frame duration. For example, the encoding device may receive frames from 4 video streams within the encoding duration of the frame of the first video stream, and the encoding device will encode the frames from each of the 4 video streams sequentially within the frame duration. In some embodiments, the frames of each of the 4 video streams are queued and encoded in the order received by the encoding device (first in, first out). In some embodiments, one or more of the video streams may be prioritized over other video streams to encode and transmit the frame of that video stream before encoding the frame of other video streams. For example, the encoding device may receive a frame from each of a first video stream, a second video stream, a third video stream, and a fourth video stream within a small window of time. The encoding device may begin encoding the frame of the first video stream, and the frames of the second video stream, the third video stream, and the fourth video stream may arrive within the encoding duration of the frame of the first video stream. In such cases, the encoding device may prioritize, for example, the frame of the fourth video stream and alter the queue of frames to be encoded after completing the current encoding task (e.g., the frame of the first stream).

In conventional video streaming services, the time elapsed between the receipt time of a frame and the transmission time of the frame has little to no effect on the user's experience of the video stream. For example, for a non-interactive video stream, a frame of a fourth video stream may be received at substantially the start of a frame duration. Due to frames from three other video streams arriving before the frame of the fourth video stream, the total time elapsed between the receipt time of the frame of the fourth video stream arriving at the encoding device and the transmission time of the encoded frame of the fourth video stream sent to a client device for viewing may be the encoding duration of the frame of the first video stream, the encoding duration of the frame of the second video stream, the encoding duration of the frame of the third video stream, and the encoding duration of the frame of the fourth video stream. In such an example, the total time elapsed may be approximately 4 times as long as simply encoding the frame of the fourth video stream. However, this effect is transparent to the user, as the fourth video stream is non-interactive, and any delay in the encoding of the video stream is not noticeable to the user, as long as the frame rate of the video stream remains consistent.

When considering interactive video streams, such as when streaming a video game, other remotely executed software application, or cloud-based software service, the total time elapsed between the receipt time and transmission time of a frame of a video stream at the encoding device introduces or contributes to lag between a user's input from the client device to the server device. In the example of the fourth video stream above, the additional lag would correspond to nearly an entire frame of the video game, degrading the user's experience and responsiveness of the video game or other interactive software.

In some embodiments, according to the present disclosure, the encoding device can temporally multiplex the encoding processes of the video streams by transmitting delay instructions to the server device(s) to delay rendering and/or transmission of the frame(s) of the video stream. For example, the encoding device may calculate a delay timing and instruct a server device to delay the rendering of a frame of the video stream by, for example, 8 ms, to ensure the frame arrives just-in-time for the encoding device to complete a prior encoding task and be available to encode the frame immediately. By coordinating the server devices, the "just-in-time" encoding can limit and/or eliminate delays beyond the encoding duration for each video stream.

In some embodiments, an interactive software streaming system includes a plurality of server devices that each execute a software application and render video frames for a corresponding client device of a plurality of client devices. The system includes an encoding device positioned therebetween in the data communication channels and/or the network. For example, the first server device transmits a first frame to the encoding device, the encoding device encodes the first frame, and an encoded first frame is transmitted to the first client device. In some embodiments, the second server device also sends a second frame to the encoding device, and the second frame is received at the encoding device while the encoding device is encoding the first frame. In such an example, the encoding device delays encoding the second frame until the encoded first frame is completed.

While this delay is not noticeable to a user with a non-interactive video stream, with an interactive video stream, such as a streamed video game, the delay can impact the quality of the user's experience. For example, a user will input a user input at the third client device in response to seeing the encoded third frame. The user input is transmitted to the respective third server device with the associated delay due to the encoding delay. In some embodiments, a server device is a video game server. In such an example, a user's experience can be negatively affected by a lag between the user input and the received video frame of as little as a single frame.

In some embodiments, the encoding device can transmit a delay instruction to each server device. The delay instruction coordinates the rendering of the video frames of the server device and the transmission of the video frames to the encoding device. By coordinating the rendering and/or transmission of the video frames, the delay instruction can allow the encoding device to limit any delay associated with the encoding tasks. In particular, by instructing the server device to delay the rendering of the frames of the interactive software, the total delay between the actions or effects taking place in the interactive software and the user viewing the video frames associated with the actions or effects is reduced. In at least one example, a second server device receives a user input from the second client device and renders a video frame that reflects the user input (such an item select in an interface or activating an ability of an avatar in a game environment). A delay in the video frame arriving at the second client device for viewing by the user can cause the video and user inputs to feel disconnected or "laggy" to the user. A second delay instruction to the second client device can, for a single frame, delay the rendering of the video frames of the interactive software to reduce the perceived input lag for all subsequent video frames and improve the perceived responsiveness of the interactive software rendered at the second server device to the user at the second client device.

In some embodiments, a first video stream frame is received by an encoding device at T=0. Each of the second video stream frame, the third video stream frame, and the fourth video stream frame are received at the encoding device at 1-2 ms intervals (e.g., T=2 ms, T=3 ms, T=5 ms). The first encoding duration is approximately 4 ms, and each of the second video stream frame and the third video stream frame are received during the first encoding duration, and the fourth video stream frame is received during the second encoding duration. The first video stream frame is encoded substantially immediately upon received the first video stream frame, but the arrival of each of the second video stream frame, the third video stream frame, and the fourth video stream frame during the first encoding duration (e.g., while the encoding device is busy with another encoding task) causes subsequent delays. For example, the second encoding duration begins only after the first encoding duration ends, and the third encoding duration begins only after the second encoding duration ends, and so forth. In many examples, the frame rendering rate of the server devices is substantially constant, and the timing of video stream frames repeats during each frame duration.

It should be understood that, while the encoding duration is described herein as the duration of time needed to encode the video stream frame, the encoding duration, in some embodiments, includes processor time to perform additional processing on the video frame prior to encoding the video frame. For example, in order to encode the first video stream frame with a particular codec, the encoding device may first decode the video stream frame and then re-encode the first video stream frame. In other examples, the encoding device may apply one or more video effects or post-processing operations on the video stream frame prior to encoding the video stream frame, and the encoding duration is the amount of time needed to apply the video effect and encode the video stream frame. In any example, it should be understood that the encoding duration is the duration of time the encoding device performs operations on the video stream frame between a receipt time until the encoding is complete at an encoding completion time.

In some embodiments, while the first video stream frame experiences only the first encoding duration between the first receipt time and the first transmission time (after encoding), each of the second video stream frame, the third video stream frame, and the fourth video stream frame experience an additional delay beyond the respective encoding duration between the respective receipt time and encoding completion time and/or transmission time. In some examples, the encoded video frame is transmitted upon completion, and the transmission time is substantially the same as the completion time. In some examples, the transmission time is after the completion time. In at least some embodiments, calculating the delay duration based on the transmission time reduces any encoding delays perceived by the user viewing the encoded video stream at the client device.

A second delay duration of the second video stream frame is measured, calculated, recorded, or otherwise determined by the encoding device. The encoding device can then transmit the delay instruction back to the second server device based at least partially on the second delay duration. Likewise, the third delay duration and fourth delay duration are determined for the third video stream frame and the fourth video stream frame, and delay instructions are transmitted back to the third server device and fourth server device, respectively.

In some embodiments, the first video stream frame of a subsequent frame duration is received at the encoding device at the first receipt time, encoded for the first encoding duration, and the encoded frame is transmitted at the first transmission time. The second video stream frame is received at the encoding device at the second receipt time, which may be substantially the same time as the first transmission time, encoded for the second encoding duration, and the encoded frame is transmitted at the second transmission time. The third video stream frame is received at the encoding device at the third receipt time, which may be substantially the same time as the second transmission time, encoded for the third encoding duration, and the encoded frame is transmitted at the third transmission time. The fourth video stream frame is received at the encoding device at the fourth receipt time, which may be substantially the same time as the third transmission time, encoded for the fourth encoding duration, and the encoded frame is transmitted at the fourth transmission time.

When the delay instructions instruct the server device(s) to delay the rendering and/or transmission by the determined delay duration, there is substantially no gap between each transmission time and successive receipt time (e.g., first transmission time and second receipt time) and the encoding tasks (i.e., the encoding durations) will be tightly packed in sequence. In some embodiments, this will allow efficient use of the encoding device processing capabilities, and the tightly packed encoding tasks will leave any available idle processor time for the encoding device available at the end of the sequence of encoding tasks to allow additional video streams to be added to the encoding device multiplexing. In some embodiments, each encoding duration of the frame duration is approximately 4 ms within a 16.67 ms frame duration. This leaves little idle time for the encoding device processor. However, if each encoding duration is 4 ms for a 30 fps frame duration, the four video stream frames have a total encoding duration of 16 ms in a 33.33 ms frame duration, allowing approximately 17.33 ms of idle processor time in the encoding device. In some embodiments, a contiguous 17.33 ms of idle processor time is preferable to smaller non-contiguous blocks of idle processor time.

In some embodiments, tightly packing the encoding tasks in a sequence with little to no gaps between encoding task can be beneficial to allocating additional video streams to the encoding device, allocating other processing tasks to the encoding device (such as in the example of a multi-functional computing device), or allowing additional processing buffer time for variations in encoding duration of each frame received at the encoding device.

In some embodiments, a method of encoding interactive software video streams includes receiving a first video stream frame from a first server device at an encoding device at a first receipt time and receiving a second video stream frame from a second server device at the encoding device at a second receipt time. In some embodiments, at least one of the first video stream from the first server device and the second video stream from the second server device is a video stream of an interactive software application. In some embodiments, the first server device is a video game server. In some embodiments, the second server device is a video game server. In some embodiments, both the first server device and the second server device are video game servers.

The method further includes encoding the first video stream frame with the encoding device. In some embodiments, encoding the first video stream frame includes AVC, HEVC, VP8, VP9, AV1, AV2, and other codec encoding processes. In some embodiments, encoding a video stream includes transcoding the video stream. For example, the method 326 may include decoding the video stream when the video stream has been previously encoded (such as a previously compressed video) and re-encoding the video stream after decoding.

In some embodiments, the video stream is transcoded to change the encoding of the video stream. In some embodiments, additional video processing may be performed on the video stream prior to encoding. For example, video effects, such as post-processing, quality analysis, and/or shaders may be applied to the video frame(s) of the video stream prior to encoding, and in some examples, the video stream is decoded to allow the application of such video effects prior to re-encoding. In other examples, a first video stream and a second video stream may be merged and/or composited before encoding the outgoing video stream. In some instances, the first video stream and/or second video stream are decoded prior to merging and subsequent encoding of the merged outgoing video stream.

In some embodiments, the method further includes determining a delay duration based at least partially on an encoding time of the first video stream frame and the second receipt time. For example, a delay duration may be based at least partially on a time difference the second receipt time and an end of the first encoding duration of the first video stream frame. In another example, the delay duration may be based at least partially on a time difference the second receipt time, an end of the first encoding duration of the first video stream frame, and a time buffer to allow variations in the first encoding duration. In at least one example, the delay duration of the second video stream frame is a time difference between a second receipt time and a first transmission time of the first video stream frame at the end of the first encoding duration. In some embodiments, the delay duration is based at least partially on the first encoding duration relative to a frame duration (e.g., the available time to encode the second video stream frame) as will be described herein.

The method includes transmitting a delay instruction to the second client device based at least partially on the delay duration and encoding the second video stream frame. In some embodiments, the method repeats with a second set of frames arriving from the first video stream and the second video stream.

As described herein, it may be desirable to tightly pack the encoding tasks to provide a contiguous idle processor time in the frame duration. It should be understood that while some embodiments of a delay duration have a positive delay duration, in other embodiments, the delay duration may have a negative value or be a negative delay duration. In some embodiments, a timeline has a first frame duration wherein a second receipt time of a second video stream frame is within a first encoding duration of the first video stream frame. The first frame duration includes a second encoding duration and a third encoding duration. In some embodiments, a second frame duration after the first frame duration reflects a reduced first encoding duration, such as the encoding device requiring less processing time to encode the subsequent first video stream frame in the first video stream.

In some embodiments, the reduced first encoding duration of the second frame duration, however, introduces a gap between the first transmission time and the second receipt time. In such an embodiment, the second delay duration may be determined to be negative as the second receipt time is after the first transmission time and/or the difference between the first receipt time and the second receipt time is greater than the first encoding duration in the second frame duration.

A delay instruction may be transmitted from the encoding device to the second server device (and, optionally, any server devices associated with subsequent video streams such as the third server device) to instruct the second server device to provide future frames earlier by an amount related to the delay duration. The third frame duration illustrates the second receipt time and third receipt time moving earlier within the third frame duration to compensate for the change in the first encoding duration and remove and/or reduce the gap, thereby increasing the contiguous processor idle duration proximate the end of the third frame duration.

While in some embodiments, a negative delay duration value is determined for tightly packing the encoding tasks, in other embodiments, the encoding device may temporally space the encoding tasks with a minimum gap therebetween to provide a buffer. In some embodiments, the encoding tasks are temporally spaced such that the gaps between each encoding task are substantially equal. In some embodiments, a method includes receiving a first video stream frame from a first server device at an encoding device at a first receipt time and receiving a second video stream frame from a second server device at the encoding device at a second receipt time. In some embodiments, at least one of the first video stream from the first server device and the second video stream from the second server device is a video stream of an interactive software application. In some embodiments, the first server device is a video game server. In some embodiments, the second server device is a video game server. In some embodiments, both the first server device and the second server device are video game servers.

The method further includes encoding the first video stream frame with the encoding device. In some embodiments, encoding a video stream frame includes AVC, HEVC, VP8, VP9, AV1, AV2, and other codec encoding processes. In some embodiments, encoding a video stream includes transcoding the video stream. For example, the method 326 may include decoding the video stream when the video stream has been previously encoded (such as a previously compressed video) and re-encoding the video stream after decoding.

In some embodiments, the video stream is transcoded to change the encoding of the video stream. In some embodiments, additional video processing may be performed on the video stream prior to encoding. For example, video effects, such as post-processing, quality analysis, and/or shaders may be applied to the video frame(s) of the video stream prior to encoding, and in some examples, the video stream is decoded to allow the application of such video effects prior to re-encoding. In other examples, a first video stream and a second video stream may be merged and/or composited before encoding the outgoing video stream. In some instances, the first video stream and/or second video stream are decoded prior to merging and subsequent encoding of the merged outgoing video stream.

In some embodiments, the method further includes determining a delay duration based at least partially on a first encoding time of the first video stream frame, a second encoding duration of the second video stream frame, and the frame duration. In some embodiments, the encoding device determines the first encoding duration, the second encoding duration, and the frame duration. The method further includes determining an idle processor duration of a frame duration and transmitting a delay instruction to at least the second server device wherein a delay duration is based at least partially on the idle processor duration. For example, the delay instruction may space the encoding task with equal gaps between the encoding tasks within the frame duration.

In some embodiments, in a first frame duration, the encoding device receives a first video stream frame at a first receipt time, a second video stream frame at a second receipt time, and a third video stream frame at a third receipt time. In some embodiments, all three video stream frames arrive within the first encoding duration. When the first encoding duration completes, the second encoding duration begins. When the second encoding duration completes, the third encoding duration begins. When the third encoding duration completes, the encoding device processor is idle for the remainder of the first frame duration.

In some embodiments, the idle duration after encoding the first video stream frame, the second video stream frame, and the third video stream frame is divided into equal parts. A delay instruction is transmitted to each of the second server device and the third server device to delay the second receipt time and the third receipt time such that a first gap after the first encoding duration is substantially equal to the second gap after the second encoding duration, which is substantially equal to the third gap after the first encoding duration in the second frame duration. In some embodiments, the gaps each allow for variations in the encoding durations without introducing lag and/or prompting additional delay instructions transmitted to the server devices.

In some embodiments, the encoding device transmits new delay instructions to change the receipt time of video stream frames when an encoding duration varies from an expected value (e.g., previous value, average value, rolling average, etc.) by an amount greater than a threshold value. For example, the threshold value may be a nominal value, such as 1 ms, 2 ms, 4 ms, or more. In other examples, the threshold value may be a percentage value, such as a 5% variation, a 10% variation, 20% variation, etc. In some embodiments, the encoding device transmits new delay instructions to change the receipt time of video stream frames when a video stream terminates, allowing processor availability of the encoding device.

In some embodiments, the encoding device transmits new delay instructions to change the receipt time of video stream frames upon a set or adaptive time interval. For example, the time interval may be a nominal value, such as 100 ms, 200 ms, 400 ms, 1000 ms, or more. In other examples, the time interval may be a quantity of frame durations, such as 4 frame durations, 8 frame durations, 24 frame durations, 60 frame durations, 600 frame durations, or any values therebetween. In some embodiments, the encoding device transmits new delay instructions to change the receipt time of video stream frames when a video stream is assigned to or accepted by the encoding device or terminates, changing processor availability of the encoding device. For examples, the time interval may be adaptive and change with the quantity of video streams concurrently processed and/or encoded by the encoding device. In some examples, the time interval may shorten when additional video streams are concurrently processed and/or encoded by the encoding device to ensure the plurality of video streams is efficiently managed. In some examples, the time interval may lengthen when additional video streams are concurrently processed and/or encoded by the encoding device to limit the number of times delay instructions are sent to multiple server devices.

An encoding device, according to some embodiments of the present disclosure, is configured to perform some or all of any of the methods described herein. In some embodiments, an encoding device in some embodiments, includes a processor that is configured to perform all of, or at least part of, the methods described herein. For example, a computing device encoding device includes a processor in communication with a hardware storage device. The hardware storage device can be any non-transient computer readable medium that may store instructions thereon. The hardware storage device may be any type of solid-state memory; volatile memory, such as static random access memory (SRAM) or dynamic random access memory (DRAM); non-volatile memory, such as read-only memory (ROM) including programmable ROM (PROM), erasable PROM (EPROM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media. The hardware storage device includes instruction stored thereon that, when executed by the processor, cause the encoding device to perform any method or part of a method described herein.

The encoding device further includes a communication device, such as a wireless or wired communication device, that allows transmission and receipt of data between the encoding device and external computing devices, such as server devices and the client devices. In some embodiments, the encoding device receives video stream frames at the communication device from the server device(s) and transmits encoding video stream frames from the communication device to the client device(s).

In some embodiments, the encoding device optionally includes a specialized processor in data communication with the processor, such as a graphical processing unit (GPU) or an application-specific integrated circuit (ASIC) for encoding or performing additional video processing on the video stream frame(s).

The present disclosure relates to systems and methods for encoding interactive software video streams according to at least the examples provided in the sections below:

[A1] In some embodiments, a method of encoding video streams includes, at an encoding device, receiving a first video stream frame from a first server device at the encoding device at a first receipt time; receiving a second video stream frame from a second server device at the encoding device at a second receipt time; encoding the first video stream frame with the encoding device; determining a delay duration based at least partially on a first encoding duration of the first video stream frame and the second receipt time; and transmitting a delay instruction based at least partially on the delay duration to the second server device.

[A2] In some embodiments, the delay instruction of [A1] instructs the second server device to delay a transmission of a subsequent second video stream frame a duration based at least partially on to a difference between a first encoding completion time of the first video stream frame and the second receipt time.

[A3] In some embodiments, the delay instruction of [A1] instructs the second server device to delay a transmission of a subsequent second video stream frame a duration greater than a difference between a first encoding completion time of the first video stream frame and the second receipt time.

[A4] In some embodiments, the delay instruction of [A1] instructs the second server device to delay a transmission of a subsequent second video stream frame a duration based at least partially on to a difference between a first encoding completion time of the first video stream frame and the second receipt time and a gap time based on an idle duration of the encoding device within a frame duration.

[A5] In some embodiments, the delay instruction of [A1] instructs the second server device to delay a transmission of a subsequent second video stream frame a duration based at least partially on to a difference between a first encoding completion time of the first video stream frame and the second receipt time and a gap based at least partially on a first frame encoding duration.

[A6] In some embodiments, the method of any of [A1] through [A5] includes receiving a third video stream frame from a third server device at the encoding device at a third receipt time within a first frame encoding duration.

[A7] In some embodiments, the delay instruction of any of [A1] through [A6] instructs the second server device to delay rendering a subsequent second video stream frame.

[A8] In some embodiments, a transmission time of the first video stream frame of any of [A1] through [A7] is the same as a first encoding completion time of the first video stream frame.

[A9] In some embodiments, the delay instruction of any of [A1] through [A8] to the second server device instructs the second server device to transmit a subsequent second video stream frame earlier to reduce a gap between a first video stream frame transmission time and the second receipt time.

[A10] In some embodiments, the method of any of [A1] through [A9] further includes encoding the second video stream frame.

[B1] In some embodiments, a system for encoding video streams comprises an encoding device that includes a processor, a communication device in data communication with the processor and configured to receive video stream frames, and a hardware storage device in data communication with the processor. The hardware storage device having instructions stored thereon that, when executed by the processor, cause the encoding device to receive a first video stream frame from a first server device at the encoding device at a first receipt time, receive a second video stream frame from a second server device at the encoding device at a second receipt time, encode the first video stream frame, determine a delay duration based at least partially on an encoding time of the first video stream frame and the second receipt time, and transmitting a delay instruction based at least partially on the delay duration to the second server device.

[B2] In some embodiments, the system of [B1] further includes the first server device configured to render the first video stream frame.

[B3] In some embodiments, the system of [B1] or [B2] further includes the first server device configured to render the first video stream frame.

[B4] In some embodiments, the encoding device of any of [B1] through [B3] is a transcoding server.

[C1] In some embodiments, a method of encoding a video stream includes, at an encoding device, receiving a first video stream frame from a first server device at the encoding device at a first receipt time, receiving a second video stream frame from a second server device at the encoding device at a second receipt time; encoding the first video stream frame with the encoding device; encoding the second video stream frame with the encoding device; determining a delay duration based at least partially on a first encoding duration of the first video stream frame, a second encoding duration of the second video stream frame, and a frame duration; determining an idle processor duration; and transmitting a delay instruction to the second server device based at least partially on the delay duration and the idle processor duration.

[C2] In some embodiments, the second video stream frame of [C1] is part of a second video stream of an interactive software application.

[C3] In some embodiments, the delay instruction of [C1] instructs the second server device to delay transmission of a subsequent second video stream frame a duration such that a first gap after a first encoding duration of a subsequent first video stream frame is equal to a second gap after the second encoding duration of the subsequent second video stream frame.

[C4] In some embodiments, the method of any of [C1] through [C3] includes transmitting a second delay instruction when the first gap or second gap changes by an amount greater than a threshold value.

[C5] In some embodiments, the threshold value of [C4] is a nominal value.

[C6] In some embodiments, the threshold value of [C4] is a percentage of a respective encoding duration.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to embodiments disclosed herein without departing from the scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of encoding video streams, the method comprising:
    at an encoding device:
        receiving a first video stream frame from a first server device at the encoding device at a first receipt time;
        receiving a second video stream frame from a second server device at the encoding device at a second receipt time;
        encoding the first video stream frame with the encoding device;
        determining a delay duration based on at least a first encoding duration of the first video stream frame and the second receipt time, wherein the delay duration is a time duration between the second receipt time of the second video stream frame and a completion time of the first encoding duration; and
        transmitting a delay instruction to the second server device based on at least the delay duration, wherein the delay instruction instructs the second server device to delay a transmission of a subsequent second video stream frame to the encoder at least the delay duration.

2. The method of claim 1, wherein the delay instruction instructs the second server device to delay a transmission of a subsequent second video stream frame a duration based on at least a difference between a first encoding completion time of the first video stream frame and the second receipt time.

3. The method of claim 1, wherein the delay instruction instructs the second server device to delay a transmission of a subsequent second video stream frame a duration greater than a difference between a first encoding completion time of the first video stream frame and the second receipt time.

4. The method of claim 1, wherein the delay instruction instructs the second server device to delay a transmission of a subsequent second video stream frame a duration based on at least a difference between a first encoding completion time of the first video stream frame and the second receipt time and a gap time based on an idle duration of the encoding device within a frame duration.

5. The method of claim 1, wherein the delay instruction instructs the second server device to delay a transmission of a subsequent second video stream frame a duration based on at least a difference between a first encoding completion time of the first video stream frame and the second receipt time and a gap time based at least on a first frame encoding duration.

6. The method of claim 1, further comprising receiving a third video stream frame from a third server device at the encoding device at a third receipt time within a first frame encoding duration.

7. The method of claim 1, wherein the delay instruction instructs the second server device to delay rendering a subsequent second video stream frame.

8. The method of claim 1, wherein a transmission time of the first video stream frame is the same as a first encoding completion time of the first video stream frame.

9. The method of claim 1, wherein the delay instruction to the second server device instructs the second server device to transmit a subsequent second video stream frame earlier to reduce a gap between a first video stream frame transmission time and the second receipt time.

10. The method of claim 1, further comprising encoding the second video stream frame.

11. A system for encoding video streams, the system comprising:
    an encoding device including:
        a processor;
        a communication device in data communication with the processor and configured to receive video stream frames; and
        a hardware storage device in data communication with the processor, the hardware storage device having instructions stored thereon that, when executed by the processor, cause the encoding device to:
            receive a first video stream frame from a first server device at the encoding device at a first receipt time,
            receive a second video stream frame from a second server device at the encoding device at a second receipt time,
            encode the first video stream frame,
            determine a delay duration based on at least an encoding time of the first video stream frame and the second receipt time, wherein the delay duration is a time duration between the second receipt time of the second video stream frame and a completion time of the first encoding duration, and
            transmitting a delay instruction to the second server device based on the delay duration.

12. The system of claim 11, further comprising the first server device configured to render the first video stream frame.

13. The system of claim 12, further comprising the second server device configured to render the second video stream frame.

14. The system of claim 11, wherein the encoding device is a transcoding server.

15. A method of encoding a video stream, the method comprising:
    at an encoding device:
        receiving a first video stream frame from a first server device at the encoding device at a first receipt time;
        receiving a second video stream frame from a second server device at the encoding device at a second receipt time;
        encoding the first video stream frame with the encoding device;
        encoding the second video stream frame with the encoding device;
        determining a delay duration based on at least a first encoding duration of the first video stream frame, a second encoding duration of the second video stream frame, and a frame duration;
        determining an idle processor duration; and
        transmitting a delay instruction to the second server device based on the delay duration and the idle processor duration, wherein the delay duration is a time duration between the second receipt time of the second video stream frame and a completion time of the first encoding duration, wherein the delay instruction instructs the second server device to delay transmission of a subsequent second video stream frame.

16. The method of claim 15, wherein the second video stream frame is part of a second video stream of an interactive software application.

17. The method of claim 15, wherein the delay instruction instructs the second server device to delay transmission of a subsequent second video stream frame a duration such that a first gap after a first encoding duration of a subsequent first video stream frame is equal to a second gap after the second encoding duration of the subsequent second video stream frame.

18. The method of claim 17, further comprising transmitting a second delay instruction when the first gap or second gap changes by an amount greater than a threshold value.

19. The method of claim 18, wherein the threshold value is a nominal value.

20. The method of claim 18, wherein the threshold value is a percentage of a respective encoding duration.

* * * * *